United States Patent
Bhattacharya et al.

(10) Patent No.: US 7,136,261 B2
(45) Date of Patent: Nov. 14, 2006

(54) AERODYNAMICALLY SHAPED LOAD BEAM HAVING REDUCED WINDAGE AND REDUCED OFF-TRACK PES

(75) Inventors: Sandeepan Bhattacharya, Eagan, MN (US); Srinivas Tadepalli, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 140 days.

(21) Appl. No.: 10/420,326

(22) Filed: Apr. 22, 2003

(65) Prior Publication Data
US 2003/0231431 A1 Dec. 18, 2003

Related U.S. Application Data

(60) Provisional application No. 60/387,984, filed on Jun. 12, 2002.

(51) Int. Cl.
*G11B 5/55* (2006.01)
(52) U.S. Cl. .................................. 360/244.9
(58) Field of Classification Search ............. 360/244.9
See application file for complete search history.

(56) References Cited

U.S. PATENT DOCUMENTS

| | | | |
|---|---|---|---|
| 4,268,879 A | 5/1981 | Watrous | 360/104 |
| 4,760,478 A | 7/1988 | Pal et al. | 360/104 |
| 4,819,094 A | 4/1989 | Oberg | 360/104 |
| 4,996,616 A | 2/1991 | Aoyagi et al. | 360/104 |
| 5,543,985 A | 8/1996 | Donnelly et al. | 360/104 |
| 5,657,187 A | 8/1997 | Hatch et al. | 360/104 |
| 5,719,727 A | 2/1998 | Budde | 360/104 |
| 5,731,931 A * | 3/1998 | Goss | 360/244.9 |
| 5,815,348 A | 9/1998 | Danielson et al. | 360/104 |
| 5,933,293 A | 8/1999 | Bennin | 360/104 |
| 5,943,774 A | 8/1999 | Danielson et al. | 29/896.9 |
| 5,966,270 A | 10/1999 | Coon | 360/104 |
| 5,973,883 A * | 10/1999 | Yanagisawa | 360/244.9 |
| 6,014,289 A * | 1/2000 | Goss | 360/244.1 |
| 6,072,665 A | 6/2000 | Ferrari et al. | 360/104 |
| 6,147,840 A | 11/2000 | Khan | 360/245.9 |
| 6,731,465 B1 * | 5/2004 | Crane et al. | 360/244.3 |
| 2002/0085313 A1 * | 7/2002 | Boutaghou et al. | 360/244.9 |

* cited by examiner

*Primary Examiner*—A. J. Heinz
(74) *Attorney, Agent, or Firm*—Westman, Champlin & Kelly, P.A.

(57) ABSTRACT

A suspension for supporting a head slider over a media surface. The suspension includes a load beam, a base plate interface region, and a base plate. The load beam has a proximal end, a distal end and longitudinal centerline. A localized stiffening portion is raised above the load beam, and is connected to the load beam by rounded side edges. The base plate interface region is coupled to a proximal end of the load beam, and provides a pre-load bend. Finally, base plate is coupled to the base plate interface region such that the base plate is coupled to a side of the base plate interface region that is opposite the media surface.

20 Claims, 7 Drawing Sheets

AERODYNAMICALLY SHAPED LOAD BEAM HAVING REDUCED WINDAGE AND REDUCED OFF-TRACK PES

CROSS-REFERENCE TO RELATED APPLICATION

This application claims priority from U.S. Provisional Application No. 60/387,984 filed on Jun. 12, 2002 for inventors Sandeepan Bhattacharya and Srinivas Tadepalli and entitled HAT-SHAPED LOAD BEAM TO REDUCE OFF-TRACK PES.

FIELD OF THE INVENTION

The present invention relates generally to suspension arms, and more particularly but not by limitation to suspension arms for supporting a head slider over a storage disc in a disc drive.

BACKGROUND OF THE INVENTION

Computers generally require a media in which digital data can be stored and retrieved. Magnetizable (hard) layers on discs have proven to be a reliable media for data storage and retrieval. However, other types of disc drives, such as optical disc drives, are also frequently used. Disc drives that read data from and write data to hard discs have become popular components of computer systems.

Disc drives typically include a track accessing arm. The track accessing arm usually includes a head assembly, a load beam, an actuation component to move the track accessing arm, and a read/write head and slider supported by the head assembly. The head slider or slider usually has an air-bearing surface which includes rails and cavity between the rails to help the slider fly.

To access a memory location or data block on a hard disc, the read/write head is positioned above the surface of the disc while the disc rotates at an essentially constant velocity. By moving the read/write head radially over the rotating disc, all memory location on the disc can be accessed. This is typically referred to as "flying" because the head is coupled to a slider that is aerodynamically configured to hover over the surface of the disc on a cushion of air.

In a conventional disc drive, multiple discs are coupled to and rotate about a spindle. Each of the discs has two substantially flat surfaces that are capable of storing data. Typically these discs are stacked in a parallel relationship with each other. The sliders and heads are designed to move within the space between adjacent discs while flying close to the disc surface. The slider is coupled to the distal end of a thin, arm-like structure called a suspension gimbal assembly (SGA), which is inserted within the space between two adjacent discs. This SGA is made of materials and thickness so as to be somewhat flexible and to allow a measure of vertical positioning as the head hovers over the surface of the rotating disc.

Typically, SGAs are mounted and supported by an actuator arm. The actuator arm is selectively positionable by a rotary actuator assembly over a selected data track or data block of the disc to either read data from or write data to the selected data block. Historically, this actuator assembly has assumed many forms, with most disc drives of the current generation incorporating an actuator of a type referred to as a rotary voice coil actuator. Typically, the rotary voice coil actuator consists of a pivot attached to a drive housing of the disc drive. A shaft is mounted and set such that its central axis is normal to the plane of rotation of the disc. An actuator housing is pivotally mounted to the pivot shaft and supports a coil which is supported in a magnetic field generated by an array of permanent magnets.

When controlled direct current is applied to the coil, an electromagnetic field is formed which interacts with the magnetic field of the permanent magnet that is in proximity to the coil. This causes rotation of the actuator housing in accordance with the well-known Lorentz relationship. As the actuator housing rotates, the read/write head is moved radially across the data tracks on the disc. Control of the movement of the head from track to track on the disc surface is commonly accomplished through the use of the closed loop servo system. When an access command is sent to the disc drive, a comparison is made between the current position of the head relative to the disc and the location of the desired data transfer on the disc. If the head is currently positioned over the desired track, the disc drive simply waits for the correct circumferential location to rotate under the head, and then begins the requested data transfer. If however this transfer is to take place at a location other than the present position of the actuator, servo control system determines both the distance and direction that the actuator must move in order to bring the head over the target track. Based on this determination, servo control system applies controlled direct current to the coil of the actuator voice coil motor, which causes the actuator to move from the current track location to the desired target track.

When the disc assembly is rotated at high speed, the air adjacent to the spinning disc or discs moves as well. This moving air, as it passes by the actuator and the fixed structures surrounding the disc assembly, can cause undesirable vibrations and windage losses in the disc drive, due to turbulence and friction. These flow disturbances can cause the disc, read/write heads, and actuators to vibrate, making precision tracking operations difficult. Windage losses require more power to be used in order to rotate the disc. Further, windage losses and vibration increase dramatically as the rotational speed of the discs in the disc drive increase. These external vibrations may excite the load beam and gimbal spring at their respective resonant frequencies, thus any input motion or external vibration may be amplified substantially, thus causing unstable fly characteristics and misalignment of the read/write head relative to the disc surface.

Currently, discs are rotated at 10,000 and 15,000 revolutions per minute (RPM) in a high performance disc drive. It is anticipated that rotational speeds of the discs will continue to increase in future designs. This will further amplify the existing problems of windage and vibration. Furthermore, track density or the number of tracks per inch on the surface of the disc is anticipated to increase since there is continued pressure in the industry to add storage capacity to disc drives. As tracks become smaller, vibrations become more problematic as accurate tracking of the head slider becomes more difficult.

The turbulent airflow generated by the two rotating platters or discs influence the SGA such that higher non-repeatable runout excitation is observed on internal heads. Internal heads are those read/write heads that are attached to the actuator and positioned between the two discs. That is the head slider has a disc both above and below the head slider when viewed in profile. Further, the turbulent air causes communication between the two Suspension Gimbal Assemblies because of their close proximity to each other. A common solution to reduce this effect has been to increase the disc spacing. However, as the form factors of hard disc drives decrease it is becoming increasingly difficult to increase the disc spacing when both high capacity and high performance are desired. Therefore it is desirable to have a suspension gimbal assembly that reduces the effects of windage while conserving valuable Z-height space.

Embodiments of the present invention provide solutions to one or more of these and/or other problems, and offer other advantages over the prior art.

SUMMARY OF THE INVENTION

The present invention is directed towards a suspension for supporting a head slider over a media surface. The suspension includes a load beam, a base plate interface region, and a base plate. The load beam has a proximal end, a distal end and a longitudinal centerline. A localized stiffening portion is raised above the load beam, and is connected to the load beam by rounded side edges. The base plate interface region is coupled to the proximal end of the load beam, and provides a pre-load bend. Finally, the base plate is coupled to the base plate interface region such that the base plate is coupled to a side of the base plate interface region that is opposite the media surface.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
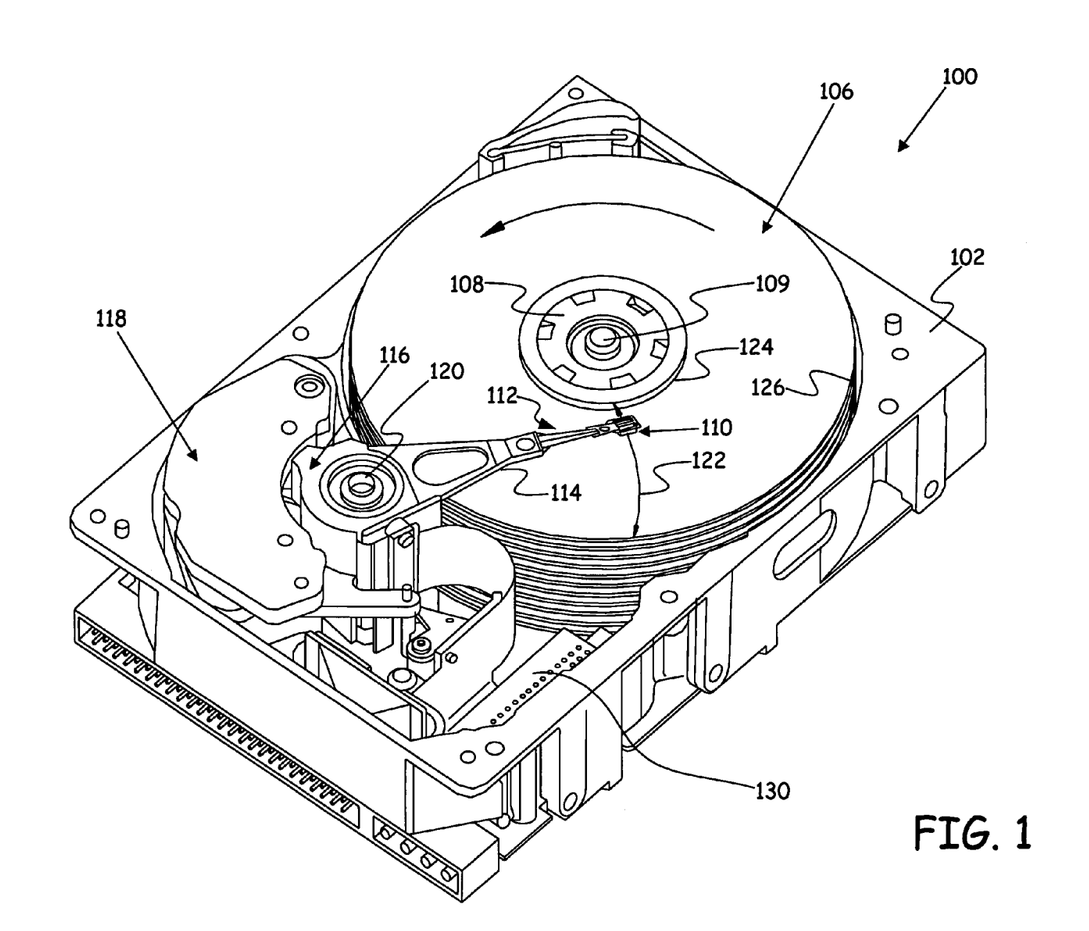
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics or controller 130 based on signals generated by heads 110 and a host computer (not shown).

Figure 2:
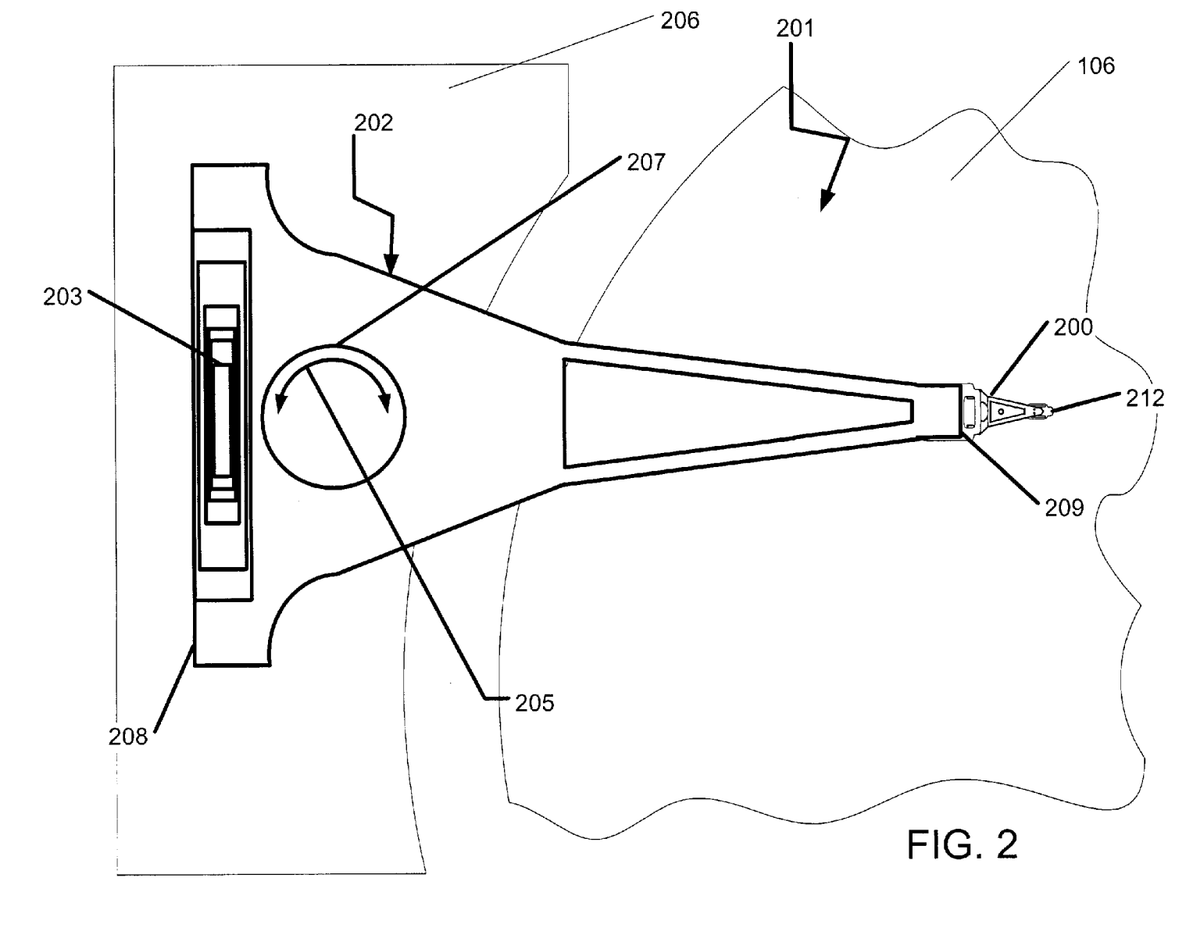
FIG. 2 is a top plan view of an actuator arm.

FIG. 2 is a top plan view illustrating an actuator arm 201 according to one illustrative embodiment of the present invention. Actuator arm 201 includes a track accessing arm 202, a head slider 212 and a suspension 200. For purposes of clarity only one suspension 200 is shown as being included in actuator arm 201. However, those skilled in the art will realize that when the actuator arm 201 is used in a disc stack a second suspension 200 can be included in actuator arm 201, such that each suspension supports a head slider 212 over a respective disc in disc stack 106.

Track accessing arm 202 is connected to the disc drive housing 206 at a pivot area 207, which is located near a proximal end 208 of the track accessing arm 202. At the proximal end 208 of track accessing arm 202 is disposed an actuation or actuator component 203. Actuator component 203 causes track accessing arm 202 to rotate about pivot area 207 as indicted by arrows 205. However, other arrangements for moving track accessing arm 202 can be used. This movement and the associated force causing the movement of arm 202 occurs according to the well-known Lorentz relationship. In one embodiment, actuator component 203 is a voice coil, which generates an electrical/magnetic field in response to an applied current from servo controller 130. Alternatively, actuator component 203 can be a permanent magnet or other components capable of applying a force to cause the track accessing arm 202 to move radially about pivot area 207.

Suspension 200 is attached to a distal end 209 of tracking accessing arm 202. Suspension 200 connects the track accessing arm 202 to a head slider 212. Suspension 200 also provides a pre-load force which forces the head slider 212 toward the disc surface 106. Further, suspension 200 is flexible in pitch and roll directions in order to allow head slider 212 to follow the topography of disc 106. Suspension 200 will be described in greater detail below.

Attached to the distal end of suspension 200 is head slider 212. Head slider 212 includes an airbearing surface 216 (FIG. 3B), which faces the disc head surface 106. As the disc rotates, the airbearing surface 216 of slider 212 pitches and rolls until an equilibrium is reached where a center of pressure on the airbearing surface 216 is defined. Head slider 212 contains a read/write head or transducers (not illustrated separately) that is configured to write data to and read data from a track on disc 106. Head slider 212 is connected to suspension 200 such that the pre-load force generated by the suspension 200 is applied over the defined bearing center of pressure. However, depending on the particular application, the attachment between head slider 212 and suspension 200 can occur at other areas of head slider 212. Furthermore, the attachment and force transfer can occur through the use of a gimbal.

Figure 3A:
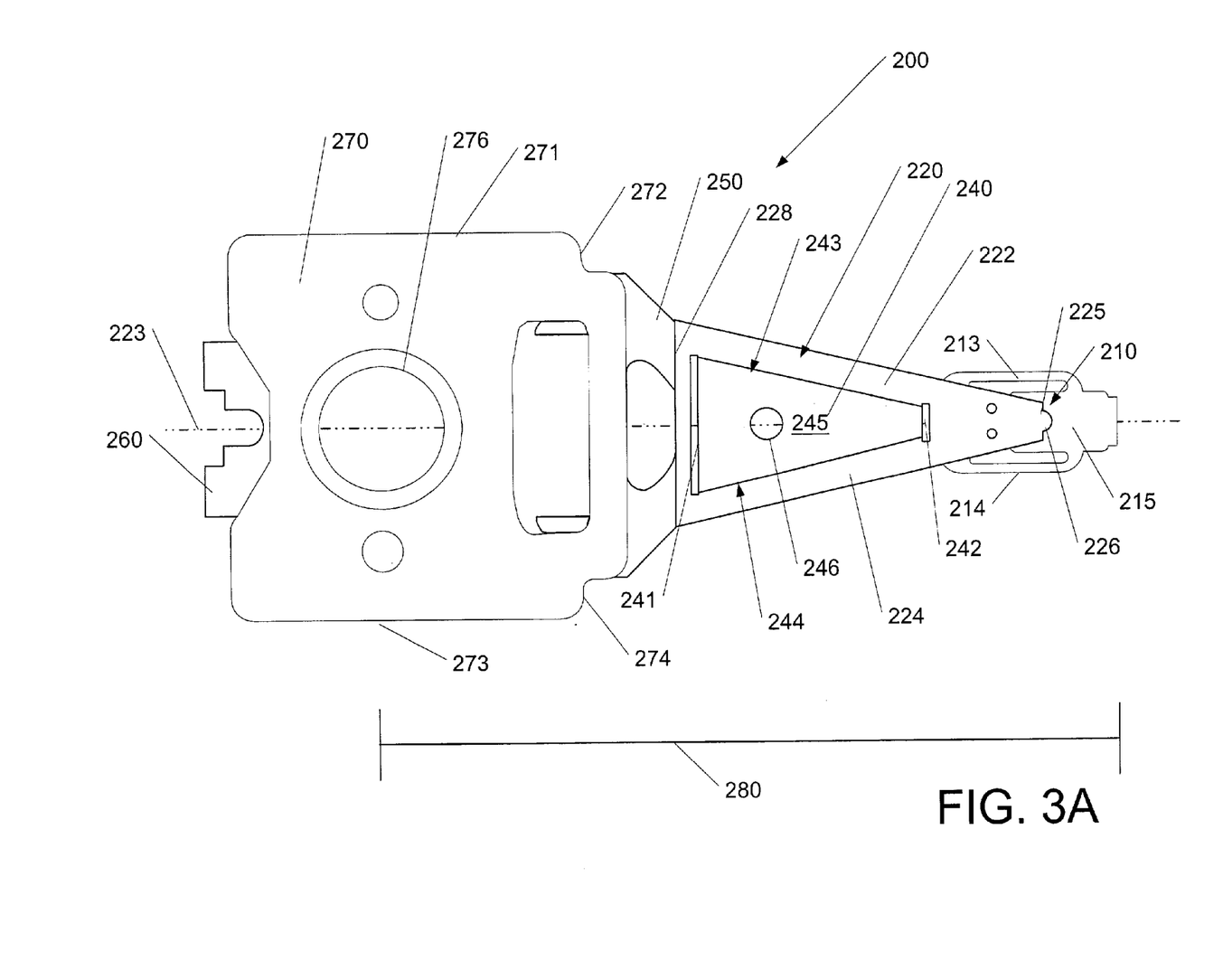
FIG. 3A is a top plan view of a head suspension assembly.
Figure 3B:
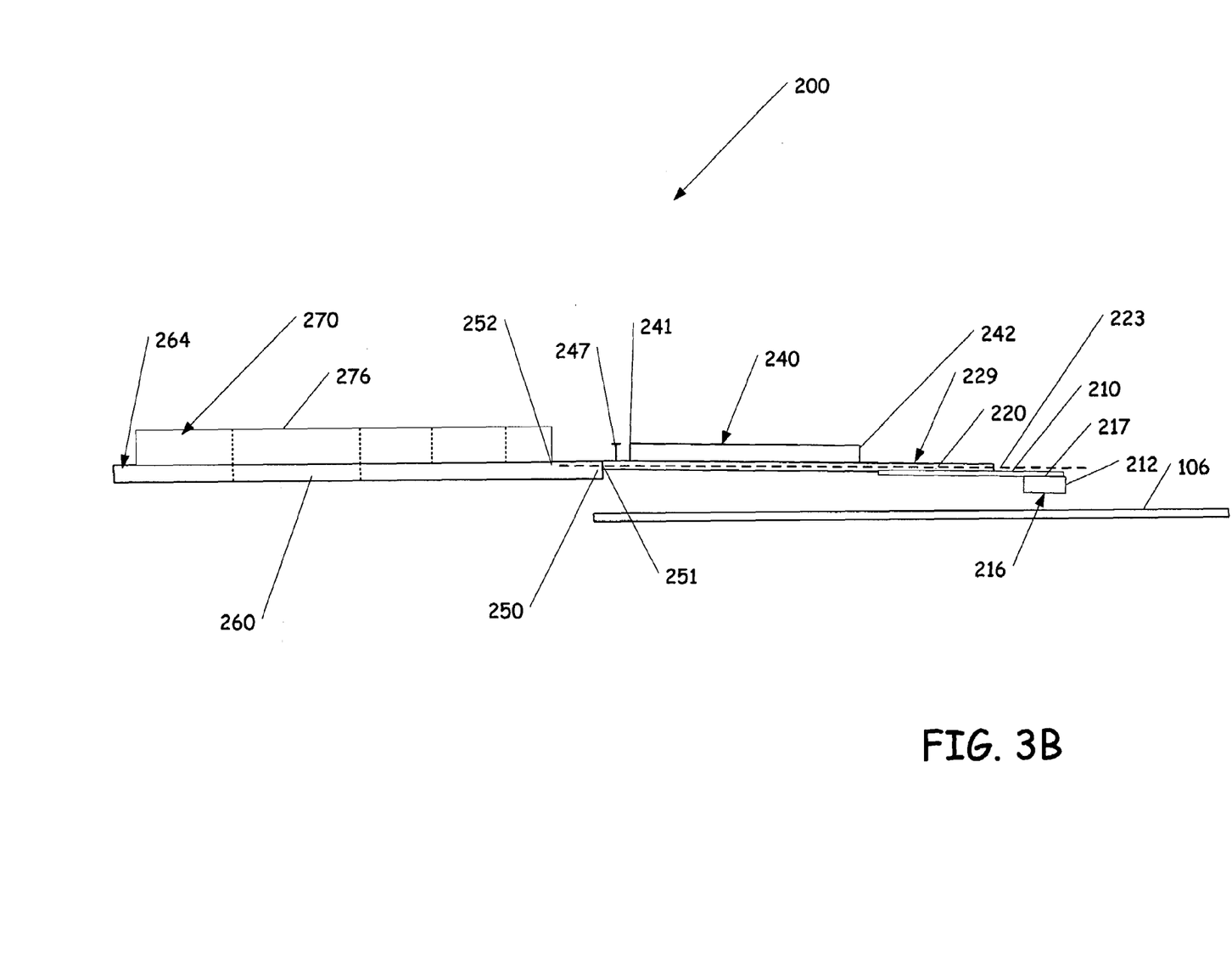
FIG. 3B is a side view of the head suspension assembly in FIG. 3A.
Figure 3C:
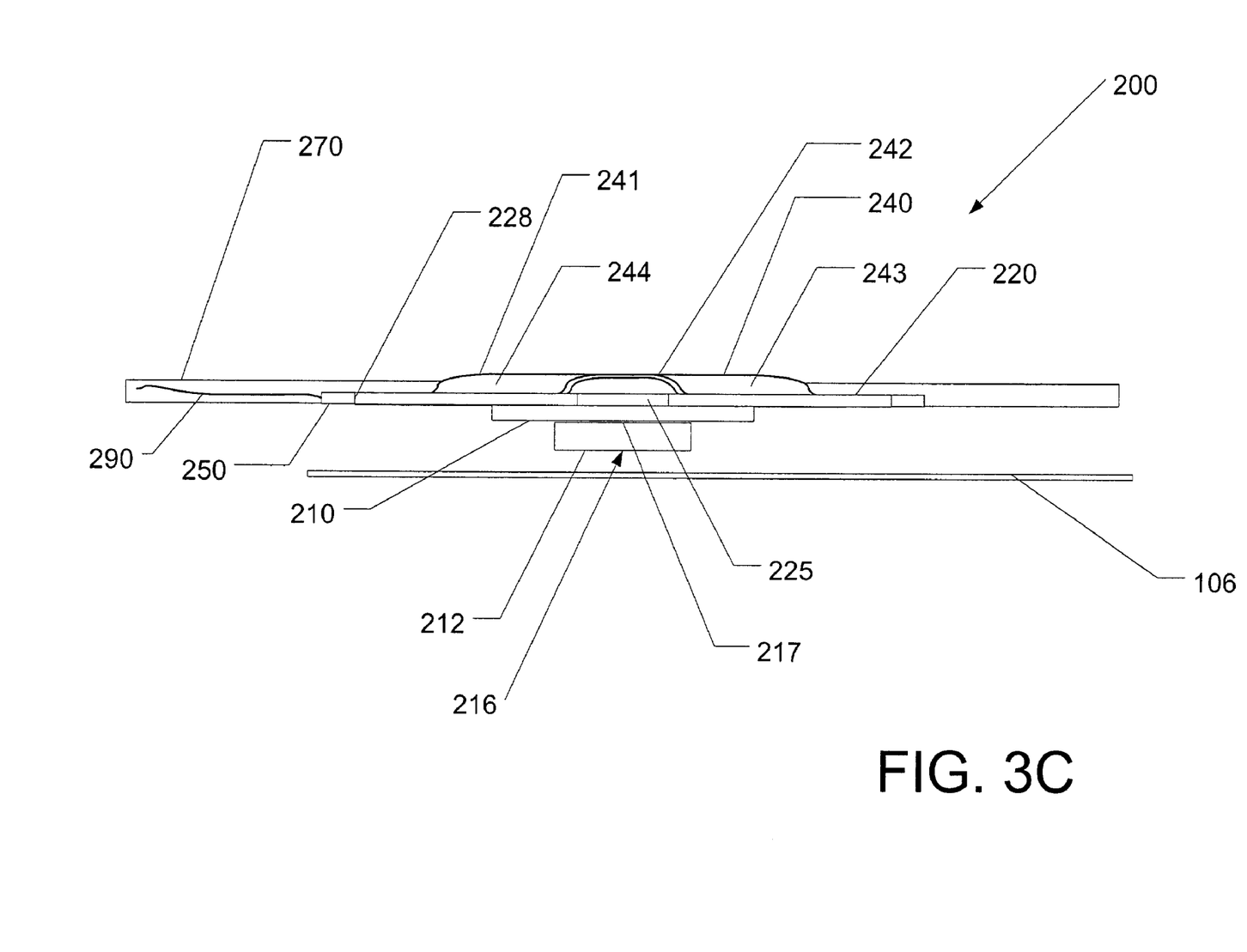
FIG. 3C is an end on view of the head suspension assembly in FIG. 3A.

FIG. 3A is an enlarged top plan view diagrammatically illustrating head suspension 200 according to one embodiment of the present invention. FIG. 3B is a side view illustrating the single suspension 200 according to this embodiment of the present invention. FIG. 3C is an end on view looking toward the track accessing arm 202 illustrating features of suspension 200 in this embodiment.

Referring now to FIG. 3A, suspension 200 includes a head gimbal assembly 210, a load beam 220 and a base plate 270. In the embodiment illustrated by FIGS. 3A–3C, suspension 200 has an effective length 280 of less than 14 mm. In a preferred embodiment suspension 200 has a length 280 of 11 mm. However, other lengths 280 less than 14 mm or 11 mm can be used, such as 9.5 mm.

Head gimbal assembly (HGA) 210 supports head slider or data head 212 over storage disc 106. Head gimbal assembly 210 includes gimbal arms 213 and 214, and cross beam 215. Cross beam 215 is coupled between gimbal arms 213 and 214 in order to support a mounting point 217 (FIG. 3C). Mounting point 217 is aligned to couple a portion of the head slider 212 to a portion of HGA 210, and has a surface that is shaped to maximize this available bonding area. Head gimbal assembly 210 is compliant and allows head slider 212 to pitch and roll about an axis. HGA 210 further allows head slider 212 to move in response to minor variations in the surface of the disc 106. Head gimbal assembly 210 also assists in stiffening head slider 212 in both yaw and in-plane axis motions, and provides for positioning of head slider 212's transducer (not illustrated separately) relative to data recorded on disc 106.

Load beam 220 supports the head gimbal assembly 210 over the disc 106, and provides a structure for attaching wires or flex cable which run from head slider 212 to an interface circuit on the disc drive. Load beam 220 includes two support arms 222 and 224 and a stiffening portion 240. A distal end 225 of load beam 220 includes a load point 226, which transmits the pre-load force from the pre-load bend radius 250 to the head gimbal assembly 210 and the head slider 212.

Support arms 222 and 224 are formed in load beam 220 and extend at an angle away from load point 226 towards the pre-load bend radius 250. Support arms 222 and 224 provide structure to carry the flex cable from the head slider 212 to the interface circuit. Further, support arms 222 and 224 help in transmitting the pre-load force from the pre-load bend radius 250 to the load point 226. In the configuration illustrated in FIG. 3A, arms 222 and 224 have a generally constant width from the pre-load bend radius 250 to the load point 226. However, arms 222 and 224 may have a width which tapers along a longitudinal axis or centerline 223 whereby the wide end of the beams is at the proximal end 228 of the arms 222 and 224 and the narrower end of the arms is at the distal end 225. While support arms 222 and 224 are illustrated in FIG. 3A angling away from each other as they move proximally from the load point 226 towards pre-load bend radius 250, those skilled in the art will realize that other arrangements for support arms 222 and 224 can be used. For example support arms 222 and 224 may be parallel to each other.

A stiffening portion 240 of load beam 220 is formed in the space between support arms 222 and 224. Stiffening portion 240 provides increased stiffness for the suspension 200, while eliminating the need for side rails commonly found in prior art suspensions. The stiffening portion 240 is raised above a surface 229 (FIG. 3B) defined by the support arms 222 and 224 by a height 247. In one embodiment height 247 is between approximately 3 mils and approximately 5 mils. However, other height can be used. Stiffening portion 240 runs or extends from a proximal point 241 to a distal point 242 of the load beam 220. The elimination of traditional side edges or rails from suspension 200 reduces communication between the adjacent head suspension assemblies (crosstalk) that are attached to the same track-accessing arm, as the airflow over the suspension is cleaner (less turbulent). Side edges 243 and 244 of the stiffening portion 240 are aerodynamically profiled such that the turbulent flow interaction with suspension 200 is reduced. This aerodynamic profile reduces the drag experienced by the suspension as the airflow over suspension 200 becomes more streamlined and laminar. Further, this aerodynamic profiling of suspension 200 results in a reduced likelihood of off-track non-repeatable run out (NRRO).

In one embodiment, as illustrated in FIG. 3C, the stiffening portion 240 of the load beam 220 has a generally hat-shape form. This hat-shape form is exemplified by the rounded side edges 243 and 244 which connect the load beam support arms 222 and 224 to the stiffening portion 240. This hat-shaped structure provides local stiffness in regions of maximum turbulent excitation. In order to both reduce the exposed surface area, and hence reduce the resultant air resistance, and to reduce windage effects of the suspension 200, a hole or aperture 246 is etched or machined into a surface 245 of the stiffening portion 240. However, other methods of making hole 246 can be used. Although FIG. 3A illustrates a single hole 246 etched into the stiffening portion 240, those skilled in the art will recognize that multiple holes may be added to further reduced the exposed surface area of stiffening portion 240, and further reduce the windage effects. The design of suspension 200 minimizes the suspension surface area, thus reducing out-of-plane forces, because the wetted surface area exposed to the airflow is reduced. This reduction in wetted surface area leads to lower off-track excitation as the pressure differential between the top and bottom of the suspension 200 acts on a smaller area.

Connected to the proximal end 228 of load beam 220 is a pre-load bend radius 250. Pre-load bend radius 250 provides a pre-load force which encourages the slider/head slider 212 towards the disc surface 106. Pre-load bend radius 250 is illustratively shown in FIG. 3B. This pre-load force is generated by forming a pre-load bend 251 in the pre-load bend radius 250, which becomes elastically deformed when track accessing arm 202, suspension 200 and slider/head slider 212 are loaded into the disc drive 100. In one embodiment, the pre-load bend radius 250 provides a pre-load force in the range of 0.5 gram force (gmf) to 4.0 gram force (gmf). However, other pre-load forces can be provided depending upon the needs of the application. This pre-load force is transmitted to head slider 212 via load beam 220 and through load point 226.

Connected to a proximal end 252 of the pre-load bend radius 250 is a base plate interface region 260. In some embodiments pre-load radius 250 is a part of base plate interface region 260. Base plate interface region 260 provides a surface for base plate 270 to connect to suspension 200. Base plate 270 is mounted on the top surface 264 of the base plate interface region 260. This arrangement is in contrast with prior art base plate to suspension mounting techniques. In prior art base plate to suspension mounting techniques, the base plate is attached to the side of the suspension that is facing the disc surface. Base plate 270 also has two flanges or shelves 272 and 274 located on either side 271, 273 of the base plate 270 for center route flex and attachment. Flanges or shelves 272 and 274 allow for the attachment of the flex cable or circuit 290 going from the head slider 212 to the interface circuit 130 via the track accessing or actuator arm 202, while significantly reducing the amount of the surface area of the flex cable that is exposed to the airflow generated by the spinning disc. Hence, the shelves further contribute to reduced windage of the suspension 200.

Suspension assembly 200 is connected to the track accessing arm 202 through the base plate 270. This connection between track accessing arm 202 and suspension 200 is achieved by swaging the suspension assembly through hole 276 and base plate 270. However, other methods of attaching suspension 200 to track accessing arm 202 can also be used.

One benefit of suspension 200, arranged as described above, is that suspension 200 presents an overall flatter profile to the disc 106 than prior art suspensions. Suspension 200, in one embodiment, is constructed of laminate materials. The use of laminate materials allows for ease of manufacture while permitting suspension 200 to achieve both the desired stiffness required for operation, and allows for manufacturing of the aerodynamically profiled stiffening portion 240 of the load beam 220. However, other materials that allow for the aerodynamically profiled stiffening portion to be formed can be used in manufacturing suspension 200. When suspension 200 is made from laminate materials, the load beam 220, the stiffening portion 240, base plate interface region 260 and pre-load bend 250 are formed from a single piece of laminate.

External vibration or excitation of the suspension assembly and slider may introduce varied motion to the slider and suspension assembly. Depending upon the nature and frequency of the excitation force, the slider and suspension assembly may be exposed to torsional mode resonance, sway mode resonance, and bending mode resonance. Torsional mode motion relates to rotation or twisting of the suspension assembly about an in-plane axis. Bending mode resonance essentially relates to up/down motion of the suspension assembly relative to the disc surface. Sway mode vibration relates to in-plane lateral motion and twisting. It is important to limit resonance motion to assure stable fly characteristics for the head slider. In particular, it is important to control the torsion and sway mode resonance, since they produce a transverse motion of the slider, causing head misalignment relative to the data tracks.

During operation, the actuator 201 moves the suspension 200 to position the head slider 212 relative to selected positions on the disc surface 106. Since the suspension 200 and the actuator 201 are a mechanical system, there exists certain resonance frequencies at which external motion or vibration is amplified. Thus, depending upon the construction of the suspension assembly including the head slider 212, the frequencies of the external forces may coincide with the modes of the suspension 200 resulting in resonance. Vibration of the suspension 200 corresponding to torsional mode resonance and sway mode resonance can interfere with accurate positioning of the head slider 212 relative to the disc surface 106. Typically excitation forces are less than 10,000 Hz. However, external excitation forces can occur at higher frequencies.

Figure 4:
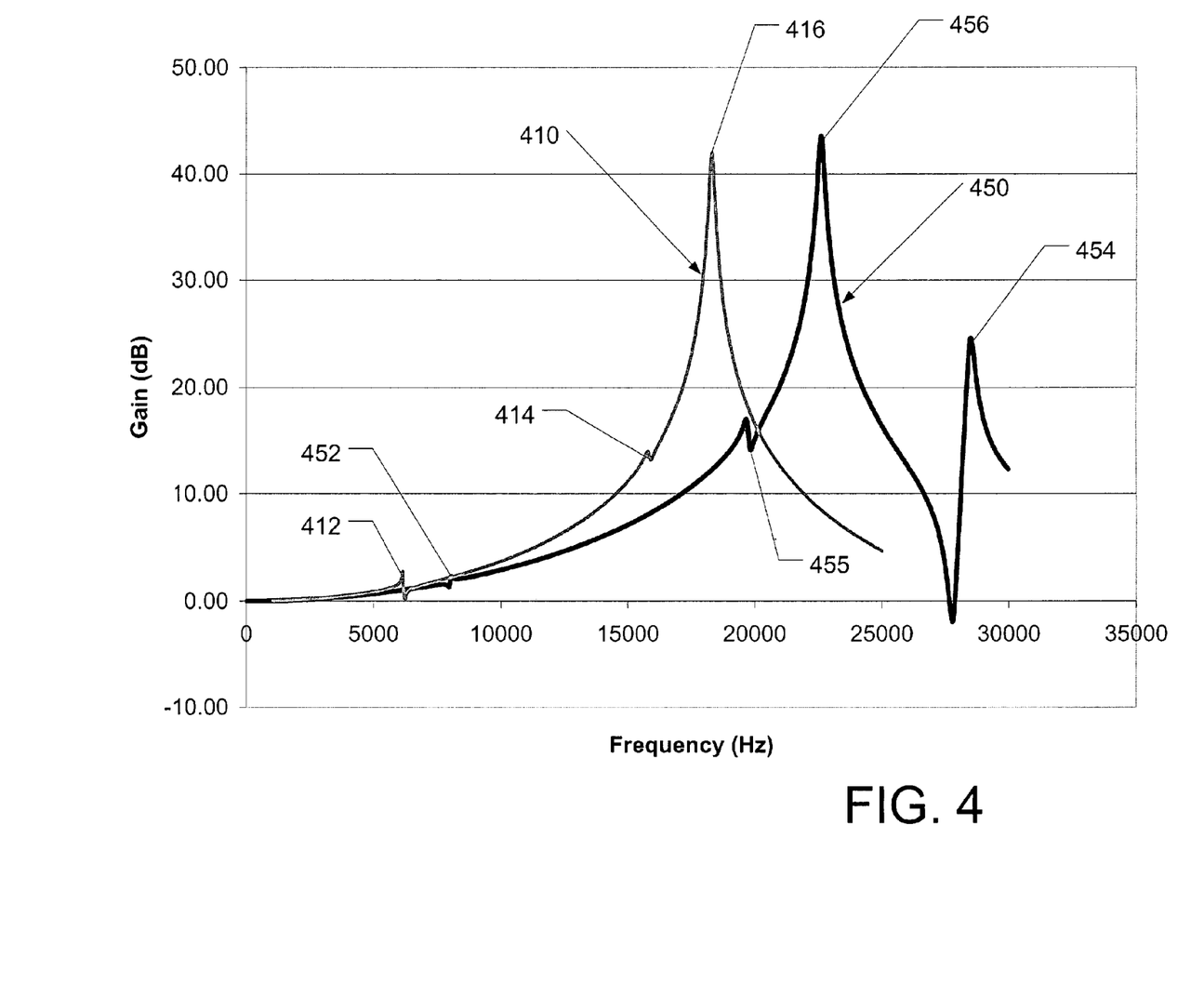
FIG. 4 is a Bode Plot of frequency response for a PRIOR ART suspension and a suspension according to the present invention.
Figure 5:
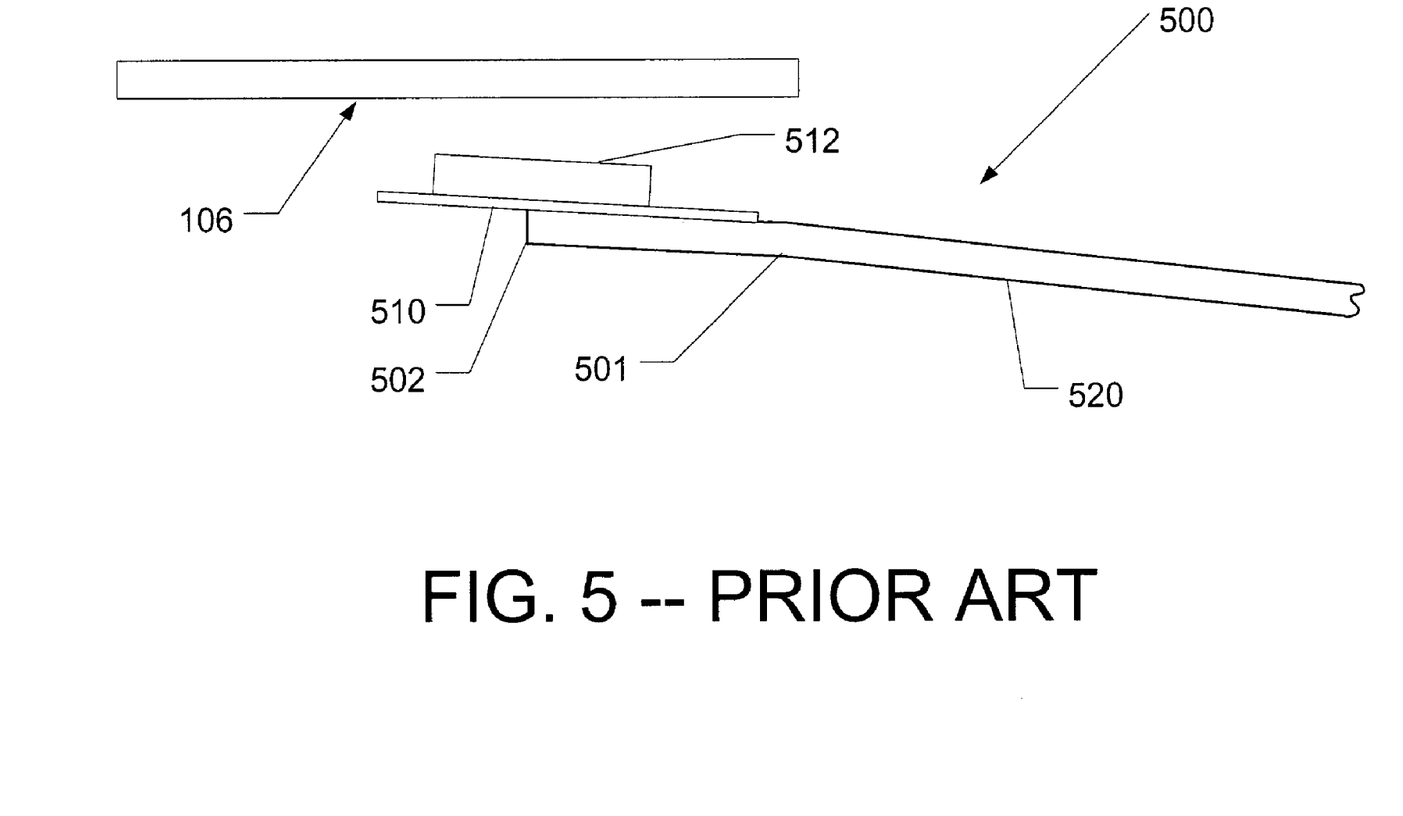
FIG. 5 is an enlarged side view of a PRIOR ART suspension secondary form.

Referring now to FIG. 4, a Bode plot illustrating the off-track resonance frequency response for a prior art suspension and a suspension 200 according to one embodiment of the present invention are shown. Plot 410 illustrates the frequency response of an exemplary prior art suspension having a suspension length of less than 14 mm. There is a first torsion mode resonance at point 412, a second torsion mode resonance at point 414 and a sway mode resonance at point 416. In the prior art the second torsion mode resonance frequency 414 is lower than the sway mode resonance frequency 416 for the suspension. As the second torsion mode resonance frequency is lower than the sway mode resonance frequency, it has been desirable to reduce the effects, i.e. magnitude, of the second torsion mode resonance in order to enhance the operational performance of the suspension. Prior art suspensions solve this problem by adding a secondary form, illustrated by element 501 in FIG. 5, to the suspension 500 near the end 502 of load beam 520, but before the HGA 510 and head slider 512. This secondary form 501 takes the shape of a small bend, similar to the preload bend, but in a direction away from the surface of the disc 106. The addition of this secondary form further increases the complexity and cost involved in manufacturing the suspension 500.

The design and features of the present invention eliminate the need a secondary form on the suspension. Referring back to FIG. 4 plot 450 illustrates the frequency response of an embodiment of the present invention. The first torsional resonance mode is shown at 452, the second torsional resonance mode is shown at 454, a gimbal torsional resonance is shown at 455, and the sway mode resonance is shown at 456. As seen in the Bode plot of FIG. 4, the second torsional resonance mode frequency 454 for a suspension 200 according to an embodiment of the present invention is higher than the sway mode resonance frequency 456. Further, when the suspension 200 is exposed to excitation frequencies that exceed the sway mode resonance frequency, other issues begin to dominate the response of the suspension 200. Therefore, the elimination of the secondary form improves the robustness of suspension 200, and reduces the number of steps, the complexity and the cost of manufacturing the suspension 200. Suspension 200 also exhibits higher overall resonance frequencies for each of the torsional and sway resonance modes than do the prior art suspensions. This higher resonance frequencies results in a reduced non-repeatable run out.

In summary, the present invention is directed towards a suspension 200 for supporting a head slider 212 over a media surface 106. The suspension 200 includes a load beam 220, 222, 224, a base plate interface region 260, and a base plate 270. The load beam 220, 222, 224 has a proximal end 228, a distal end 225 and longitudinal centerline 223. A localized stiffening portion 240 is raised above the load beam 220, and is connected to the load beam 220 by rounded side edges 243, 244. The base plate interface region 260 is coupled to a proximal end 228 of the load beam 220, 222, 224, and provides a pre-load bend 251, 250. Finally, base plate 270 is coupled to the base plate interface region 260 such that the base plate 270 is coupled to a side 264 of the base plate interface region 260 that is opposite the media surface 106.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the suspension while maintaining substantially the same functionality without departing from the scope and spirit of the present invention. In addition, although the preferred embodiment described herein is directed to a head suspension assembly for a disc drive, it will be appreciated by those skilled in the art that the teachings of the present invention can be applied to other storage mediums, without using suspensions departing from the scope and spirit of the present invention.

What is claimed is:

1. A suspension, comprising:
   a first member having a proximal end and a distal end, wherein the proximal and distal ends are connected by two support arms, the two support arms define opposite sides of an aperture in the first member;

a localized stiffening portion raised above a plane defined by the first member and coupled to the first member by rounded side edges at an inner edge of each of the two support arms, the localized stiffening portion spanning the aperture in the first member;

a base plate coupled to the proximal end of the first member via an interface portion; and wherein each of the rounded side edges are continuously rounded from a point where it connects with the inner edge of one of the support arms to a point where the raised portion is generally parallel with the support arms.

2. The suspension of claim 1 further comprising:

a shelf formed into the base plate, the shelf being shaped to allow for attachment of a flex circuit.

3. The suspension of claim 1 wherein the first member is formed of laminate materials.

4. The suspension of claim 1 wherein the stiffening portion has a proximal end, a distal end, the stiffening portion having a width at the proximal end being greater than a width at the distal end of the stiffening portion.

5. The suspension of claim 1 wherein the stiffening portion and the first member are made from a unitary piece of material.

6. The suspension of claim 1 wherein the stiffening portion is raised above the first member by a height of between about 2.5 mils and about 6 mils.

7. The suspension of claim 1 wherein at least one aperture is formed in the stiffening portion.

8. The suspension of claim 1 wherein the suspension has a length of less than 14 mm.

9. The suspension of claim 8 wherein the proximal and distal ends of the first member are connected to form a planar surface, such that a secondary form is not present in the first member.

10. A disc drive having a suspension according to the suspension of claim 1.

11. A suspension for supporting a device over a surface, comprising:

a first member having a proximal end, a distal end, forming a plane therebetween and an aperture formed in the first member,;

a stiffening portion raised above the plane of the first member, the stiffening portion being aerodynamically profiled through a pair of continuously rounded side edges;

a base plate coupled to the proximal end of the first member; and wherein the stiffing portion spans the aperture in the first member.

12. The suspension of claim 11 wherein the stiffening portion has a proximal end, a distal end, the stiffening portion having a width at the proximal end of the stiffening portion being greater than a width at the distal end of the stiffening portion.

13. The suspension of claim 11 wherein at least one aperture is formed in the stiffening portion.

14. The suspension of claim 11 wherein the suspension has a length of 11mm.

15. A disc drive having a suspension according to the suspension of claim 11.

16. A suspension for supporting a device over a surface; comprising:

a first member having a proximal end and distal end, a pair of support arms disposed between the proximal and distal ends, forming a plane therebetween, and defining an aperture in the first member;

a localized stiffening portion disposed on a separate plane than the plane of the load beam and coupled to an inner edge of each of the support arms of the first member by continuously rounded side edges between the plane of the first member and the plane of the stationary portion; and a base plate coupled to the proximal end of the first member.

17. The suspension of claim 16 wherein the suspension is composed of laminate material.

18. The suspension of claim 16 wherein the stiffening portion has a proximal end, a distal end, the stiffening portion having a width at the proximal end being greater than a width at the distal end of the stiffening portion.

19. The suspension of claim 16 wherein at least one aperture is formed in the stiffening portion.

20. The suspension of claim 16 the suspension has a length of less than 14 mm.

* * * * *

UNITED STATES PATENT AND TRADEMARK OFFICE
CERTIFICATE OF CORRECTION

PATENT NO. : 7,136,261 B2 Page 1 of 1
APPLICATION NO. : 10/420326
DATED : November 14, 2006
INVENTOR(S) : Sandeepan Bhattacharya et al.

It is certified that error appears in the above-identified patent and that said Letters Patent is hereby corrected as shown below:

Column 9,
Line 3, delete ",".

Column 10,
Line 3, delete "whcrcin the stiffmg portion spans the apcrturc in thc first" and insert --wherein the stiffening portion spans the aperture in the first member--.

Line 16, delete ";"

Signed and Sealed this

Twenty-third Day of January, 2007

JON W. DUDAS
*Director of the United States Patent and Trademark Office*